United States Patent

[11] 3,604,764

| [72] | Inventor | Willem Daane |
| | | Vlijmen, Netherlands |
| [21] | Appl. No. | 830,803 |
| [22] | Filed | June 5, 1969 |
| [45] | Patented | Sept. 14, 1971 |
| [73] | Assignee | LIPS N.V. |
| | | Drunen, Netherlands |
| [32] | Priority | June 5, 1968 |
| [33] | | Netherlands |
| [31] | | 6807878 |

[54] DEVICE FOR SEALABLY TRANSFERRING A LIQUID BETWEEN A STATIONARY HOUSING AND A ROTATABLE SHAFT
5 Claims, 3 Drawing Figs.

[52] U.S. Cl. .................................................. 308/5,
184/5, 308/36.1
[51] Int. Cl. .......................................................... F16c 33/10
[50] Field of Search ............................................ 184/5, 6;
308/5, 36.1, 9

[56] References Cited
UNITED STATES PATENTS

| 2,520,879 | 8/1950 | Dall .............................. | 308/5 UX |
| 2,548,229 | 4/1951 | Mendenhall ................. | 308/5 |
| 3,380,350 | 4/1968 | Stewart ........................ | 308/5 |

FOREIGN PATENTS

| 1,335,362 | 7/1963 | France ......................... | 308/5 |

Primary Examiner—Manuel A. Antonakas
Attorney—Nathaniel L. Leek

ABSTRACT: A device for transferring a liquid between a stationary housing and a shaft rotatably disposed therein includes a chamber in the housing communicating with a radial channel in the shaft, slide bearings disposed between the housing and the shaft on either side of the chamber and a compensating chamber in the housing having a diameter greater than the diameter of the first chamber whereby liquid pressure in the compensating chamber compensates for the pressure of liquid leaking past the slide bearings.

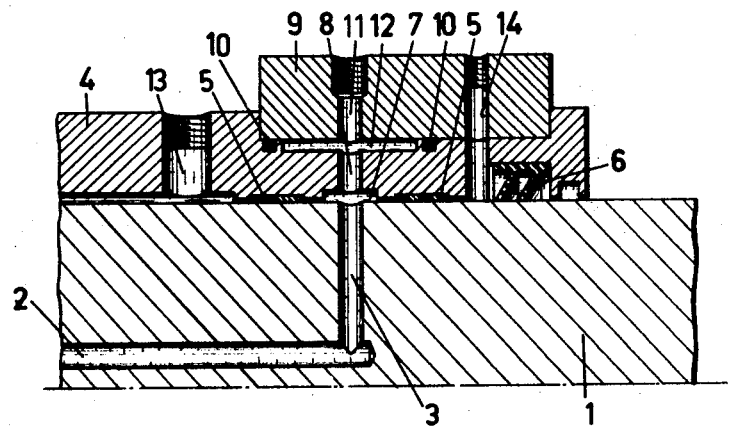
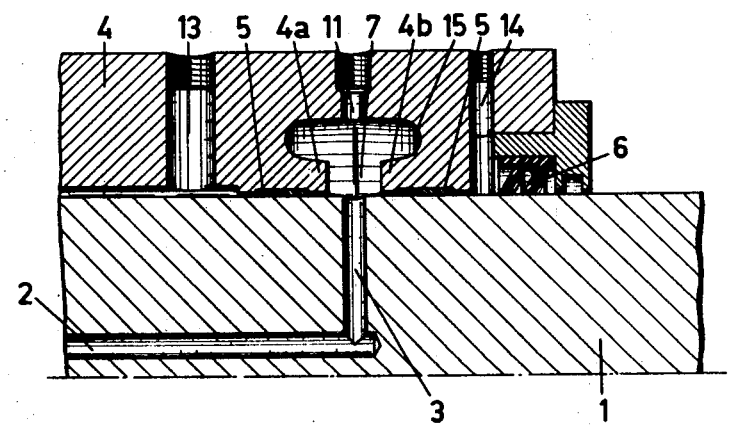
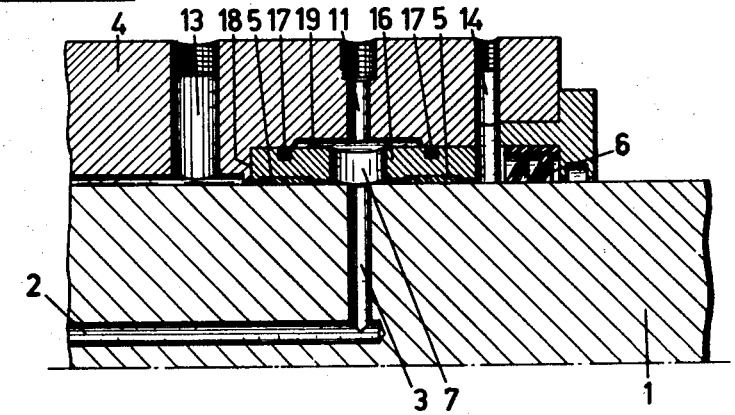

DEVICE FOR SEALABLY TRANSFERRING A LIQUID BETWEEN A STATIONARY HOUSING AND A ROTATABLE SHAFT

The invention relates to a device for sealably transferring a liquid under pressure between a stationary structure member and a rotating shaft. The shaft is rotatably supported within a tubular stationary housing in which at least one annular chamber is arranged having an inner side bounded by a part of the circumference of the shaft. A radial channel within the shaft communicates with the annular chamber and a first part, and a channel, also radial, extends at least partly through the stationary housing with the channels being connected with each other via the chamber. On both sides of the chamber slide bearings for the shaft are arranged.

The device as above described is conventional and commonly known and is shown schematically in Dutch Pat. application No. 294,348. The application of such a device lies substantially in the field of hydraulically controlled pitch propellers for ships wherein very high oil pressures must be transferred from a pump, which does not rotate with the propeller shaft, to channels within the propeller shaft. The channels extending axially through the propeller shaft are each in connection with a channel extending radially towards the circumference of the shaft where the transferring device is positioned. Generally there are two of such radial channels, each cooperating with a transferring device.

For the sake of clearness of the description only one device shall be considered, although the tubular housing contains normally two of such devices. The invention will be described for a propeller shaft of a ship with controllable pitch, although other applications are possible.

Owing to the very high pressure of the liquid to be transferred and the very great diameter of the propeller shaft of very big ships, portions of the liquid cannot be prevented from leaking through the slide bearings and into discharge lines for this leakage liquid. At the ends of the tubular housing there are seals which cooperate with the rotating shaft.

In such conventional devices the pressure in the supplied liquid causes the leakage liquid to try to escape between the shaft and the slide bearings which results in increasing the diameter of the tubular housing to a point where clearance becomes so great that an inadmissible quantity of liquid leakage occurs. Thus, only a part of the supplied liquid under pressure can be put to good use for controlling the propeller blades and unnecessary increased pumping capacity is required.

The invention aims to restrict as much as possible the leakage of liquid under pressure by providing compensation means on which the liquid under pressure acts during transferring in order to compensate the outwardly directed radial forces in the slide bearings caused by the leakage liquid.

In this manner undesirable bearing clearance caused by the liquid flowing through the slide bearings is prevented. A certain quantity of leakage will always occur, as the slide bearings have to be lubricated and cooled and the bearing clearance cannot be chosen too small, since then the temperature of the slide bearings would be too high.

According to a preferred embodiment of the invention the compensation means is formed by a ring member sealably disposed against the outer circumference of the tubular housing and having a radial channel therein aligned with a channel in the tubular housing. An annular chamber is disposed in the outer surface of the tubular housing opposite the chamber arranged at the inner surface, and the channels within the ring and the housing permit communication between the chambers.

Preferably the annular chamber arranged in the outer surface of the housing extends opposite at least a part of the lengths of the slide bearings.

The second or compensating annular chamber does not need to extend over the whole length of the slide bearings because the liquid pressure applied on the inside of the housing is not constant over the length of each slide bearing. At the end of the slide bearing directed towards the radial channel within the shaft the pressure is maximal and at the other end minimal, so that the resulting outwardly directed force, seen in a longitudinal section, is smaller than the product of the liquid pressure and the length of the slide bearings.

In the second annular chamber the maximum liquid pressure prevails everywhere so that the resulting inwardly directed force is equal to the product of the liquid pressure and the length of the second annular chamber.

On the other hand the second annular chamber must have a greater length than the first annular chamber because otherwise a sufficient compensation is not obtained. By this greater length the bearing clearance at the point of liquid transfer under pressure is decreased.

The invention will now be described with reference to the drawings, in which

FIG. 1 is a longitudinal section of a first embodiment,

FIG. 2 is a longitudinal section of a second embodiment, and

FIG. 3 is a longitudinal section of a third embodiment.

FIG. 1 shows a part of an oil-feeding case provided with a device according to the invention. A propeller shaft 1 has an axial channel 2 therein defining a first port leading to a control device of a controllable pitch propeller and a radial channel 3 in communication with radial channel 2. Other channels existing in the shaft are not shown.

A tubular stationary housing 4 is provided with four slide bearings 5 and two seals 6 with only two slide bearings 5 and one seal 6 being illustrated.

Between the slide bearings 5 in the housing 4 a recess is arranged in the form of an annular chamber 7 opposite the radial channel 3, chamber 7 being in communication with channel 3 and the outer surface of shaft 1 forming a partial boundary for chamber 7. A radial channel 8 extends through the housing 4 and communicates with the annular chamber 7, and at the other end of the channel 8 a cylindrical ring member 9 is sealably disposed against the housing 4 via O-rings 10. A radial channel 11 extends through ring member 9 in alignment with the channel 8, and the end of channel 11 defines a second port for receiving the pressure (not shown) of a liquid pump, generally an oil pump. The inner end of the channel 11 communicates with a second or compensating annular chamber 12, which is arranged in the outer circumference or surface of the housing 4 as a recess.

The annular chamber 12 has a greater diameter than the diameter of annular chamber 7 and extends over a part of the length of the slide bearings 5.

The oil which has passed the bearings 5 on both sides of the annular chamber 7, can be discharged through leakage lines 13 and 14.

During transferring of oil under pressure from the pressure line of the oil pump (not shown), the greater part of the oil flows through the channel 11, the second annular chamber 12, the channel 8, the first annular chamber 7 and the channel 3 to the channel 2 and from there to the control device for the ship's propeller (not shown). A small part of the oil, at the maximum ±15 percent, flows through the slide bearings 5 to the discharge lines 13 and 14.

The pressure of this leakage oil tends to increase the bearing clearance and to expand radially the housing 4. However, the expansion is opposed by the oil pressure acting in the chamber 12 on the housing 4 inwardly in the radial direction.

The pressures directed outwardly are not equal over the total distance between the ends of the two slide bearings 5, but change from maximum to minimum. The maximal pressure occurs at the end of each slide bearing 5 adjacent the annular chamber 7 and the minimal pressure at the other end. Thus, the resulting outwardly directed force in the axis of the channel 8, seen in the longitudinal section, is smaller than the product of the oil pressure and the total distance between the ends of both slide bearings.

In the chamber 12 the full oil pressure prevails everywhere so that the resulting inwardly directed force is equal to this pressure times the length of the chamber 12. Thus, it may be seen that for sufficient compensation the length of the chamber 12 must be greater than the length of the chamber 7, but smaller than the total distance between the ends of the slide bearings. By a correct choice of the length of the chamber 12 even an overcompensation can be provided such that the oil pressure at transferring oil provides for a radial compression of the housing.

A second embodiment of the invention is illustrated in FIG. 2 and corresponding parts are identified by the same reference numbers as in FIG. 1. The second annular chamber 15 is centrally formed in the housing 4, and chamber 15 has a greater length or diameter than and communicates directly with chamber 7. Lips 4a and 4b separate the chamber 15 partly from the shaft 1.

The oil pressure on the lips 4a and 4b provides an outwardly directed force on these lips, and as a result the pressure of the leakage oil is compensated.

The length of the chamber 15 corresponds substantially to the length of the chamber 12 in FIG. 1.

A third embodiment of the invention is illustrated in FIG. 3 and has a compensation ring member 16 arranged within the housing 4 to carry the slide bearings 5. Ring member 16 is sealed with respect to the housing 4 by means of O-rings 17 and is arranged in a recess 18 in the inner surface of the housing 4. The second annular chamber 19 is formed in the inner surface of the housing 4 adjacent ring member 16.

The oil pressure in chamber 19 is applied to the outer circumference of the ring member 16 to compensate the radial expansion thereof.

The length of the chamber 19 corresponds to the length of the chamber 15 (FIG. 2) and 12 (FIG. 1).

The device according to the invention is especially adapted for applications where high oil pressures prevail and the shaft diameters are great, such as are used nowadays in extremely large tankers. At low oil pressures and rather thin propeller shafts the "swelling" of the housing is hardly of importance and needs not to be compensated.

I claim:

1. In apparatus for sealably transferring a liquid under pressure between a tubular stationary housing and a shaft rotatably disposed therein, said device being of the type wherein said shaft has radial channel means therein extending inwardly from the outer surface of said shaft to a first port, said stationary housing has a first annular chamber therein communicating with said radial channel and having a diameter greater than the diameter of said radial channel such that said first chamber is partially bounded by the outer surface of said shaft and a second port adapted to communicate with said first chamber, and slide bearing means are disposed between said housing and said shaft on either side of said annular chamber, said liquid being transferred between said first and second ports under pressure and leaking past said slide bearing means, the improvement comprising a second annular chamber having a diameter greater than the diameter of said first chamber, said second chamber communicating with said first chamber and said second port whereby pressure of said liquid in said second chamber compensates for pressure of said liquid leaking past said slide bearing means.

2. The invention as recited in claim 1 wherein said second chamber overlies a portion of each of said slide bearing means.

3. The invention as recited in claim 1 wherein said second chamber is disposed in the outer surface of said stationary housing and communicates with said first chamber through a first channel, and a ring member is sealably disposed against the outer surface of said stationary housing to partially bound said second chamber, said ring member having a second channel therein aligned with said first channel and communicating with said second chamber and said second port.

4. The invention as recited in claim 1 wherein said second chamber is centrally disposed in said housing and said first chamber communicates directly with said second chamber.

5. The invention as recited in claim 1 wherein said second chamber is disposed in the inner surface of said stationary housing, a ring member is disposed against the inner surface of said stationary housing to partially bound said second chamber, and said first chamber is disposed in said ring member.